May 31, 1955    W. C. DAVIDON    2,709,754
METHOD AND APPARATUS FOR INDICATING
RADIOACTIVITY PERCENTAGE RATIOS
Filed April 14, 1954    2 Sheets-Sheet 1

Inventor:
William C. Davidon
By: Leonard H. Nieman
Attorney

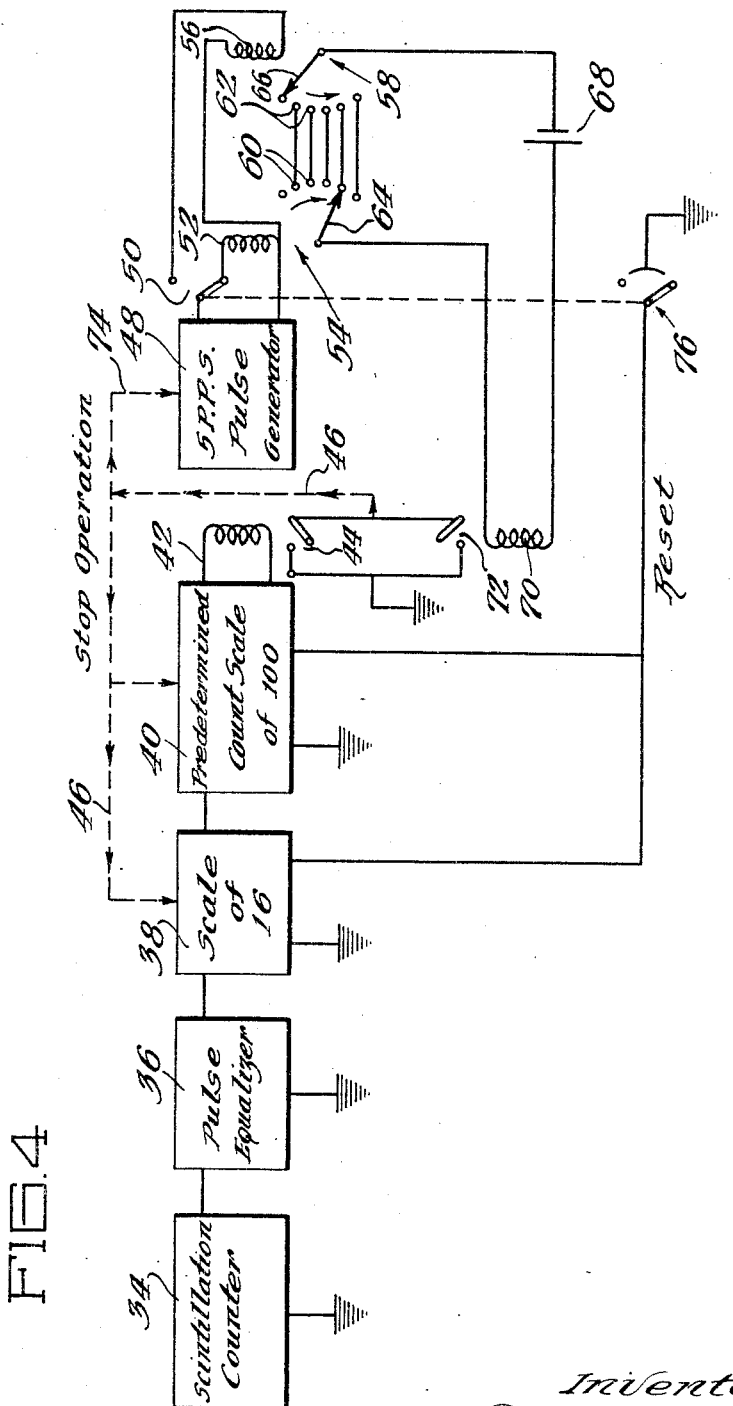

United States Patent Office 2,709,754
Patented May 31, 1955

2,709,754

METHOD AND APPARATUS FOR INDICATING RADIOACTIVITY PERCENTAGE RATIOS

William C. Davidon, Chicago, Ill., assignor to Nuclear Instrument and Chemical Corporation, Chicago, Ill., a corporation of Illinois Application April 14, 1954, Serial No. 423,138

9 Claims. (Cl. 250—83.6)

This invention relates to a device for the measurement of radioactivity, and more specifically to a method and apparatus for indicating the percentage ratio of the radioactivity of one radioactive specimen to that of a standard specimen.

In numerous applications where radioactive materials are employed, it is desirable to produce an indication of the percentage ratio of the activities of two radioactive specimens, one of which is frequently employed as a standard. In many such applications, the absolute values of the radioactivities of the various specimens are essentially of no interest, the sole desired information lying in the ratios of activities. Nevertheless, it has heretofore been the general custom to measure the respective radioactivities of the specimens involved in a manner capable of indicating the absolute activities, and then calculating the relative percentage, either by the use of conventional arithmetical computations or by the use of tables, nomographs, or similar calculation devices.

The relative difficulty and complexity of prior art methods and apparatus for determining the percentage ratios of radioactivities have constituted a serious impediment to the full utilization of radioactive isotopes in many fields, particularly in fields in which computations such as the calculation of percentages are not everyday operations which are conventionally performed by workers in those fields. As a pertinent example, it is well known that radioactive iodine is a highly effective tool in the diagnosis and therapy of thyroid disorders. The use of this technique has become widespread in hospitals and medical centers in which research and development in advanced methods of diagnosis and treatment constitute a substantial activity. The highly trained personnel of these institutions perform the various measurements and calculations required with conventional radioactivity measuring equipment on a routine basis. But the extension of the use of radioactive iodine (and, of course, other isotopes) to everyday diagnosis and therapy by medical personnel to whom the making of such measurements and calculations constitutes a completely unfamiliar endeavor has been relatively slow, so that the impact of the new techniques of isotope diagnosis and therapy has not been as great or as rapid as had been expected.

The fact that the use of radioisotope techniques in medicine, particularly in the use of radioactive iodine, has been seriously impeded by the relative complexity of the instrumentation and of the interpretation of the data obtained has been recognized both by authorities in the field of medicine and by others interested in the promotion of public health and medical science. Accordingly, a large amount of endeavor is continually directed to the simplification of the instrumentation required for medical use of radioactive isotopes, and of the manner of interpreting the data obtained. It has recently been suggested that the measurements required for thyroid diagnosis and therapy employing radioactive iodine may be made completely relative in character, thus eliminating any necessity of absolute measurements. The measurement most commonly involved is the measurement of absorption of iodine in the thyroid of the person under diagnosis or treatment. This measurement is made by suitably introducing into the body of the patient, orally or otherwise, radioactive iodine, usually in the form of orally administered sodium iodide "tagged" with $I^{131}$. After a suitable interval has elapsed, a suitable detector, such as a Geiger tube or scintillation counter, is placed in a standard position with respect to the neck of the patient, and the resultant indication is employed to determine the iodine absorbed by the patient. Because of the 8-day half-life of the iodine isotope commonly employed in this measurement, it was formerly necessary to carefully record not only the concentration of the radioactive isotope, but also the exact amount administered and the exact time of the ensuing radioactive decay. Thereupon, a relatively complex computation would be made involving all of these factors, and a conclusion reached as regards the percentage of the iodine absorbed in the thyroid of the person. In the new technique recently introduced, practically all of these operations and records are eliminated. This technique lies in the preparation of duplicate specimens at the time of administration of the iodine, one being administered to the patient and the other being merely set aside. At any time that it is desired to make a measurement of the absorption of the iodine by the thyroid, there are made measurements of the radioactivity obtained from the thyroid, as transmitted through the tissue of the neck, and also of the radioactivity of the duplicate specimen previously set aside, as transmitted through a suitable thickness of a plastic or other material simulating human tissue. The ratio of these two activities thus constitutes a measurement of the percentage absorption of the iodine in the thyroid, irrespective of the absolute value of the original activity or the absolute value of the size of the duplicate specimens, or of the amount of radioactive decay which has occurred prior to the measurement.

The improvement described above in the use of radioactivity in thyroid diagnosis and treatment, although constituting a great forward step, has still not stimulated the spreading of the use of radioactive iodine to the full extent of its potential benefit to the medical profession and to the public. The simplest instrumentation heretofore devised for this purpose has employed as the indicator therefor an integrating counting-rate meter employing a needle indicator. As is well known, a counting-rate meter is subject to the difficulty that its reading constantly varies over a range due to statistical variations in the occurrence of the radioactive emissions under measurement. The wavering of the needle of a counting-rate meter is a familiar phenomenon to persons accustomed to using such instruments, who have learned by experience to "average" the reading of the wavering needle by eye, and thus to produce a satisfactory measurement. As is well known, if the integrating time constant of the meter is made sufficiently long, the statistical fluctuation of the meter needle may be minimized, but only at the expense of requiring an inordinate period for the needle to reach its equilibrium position. Thus the counting-rate meters which have heretofore been employed for this purpose still do not meet the needs of ordinary medical personnel who do not use such equipment on a routine basis, and find it a disturbing task to assign a fixed reading to a meter whose needle is wavering over a substantial range in accordance with statistical fluctuations of the quantity being measured.

Scalers or other registers have a distinct advantage over countering-rate meters in producing an an indication a flat numerical value which does not rely on subjective interpretation. Prior to the present invention, there had been devised a satisfactory method and apparatus employing scalers or other register devices giving a fixed digital reading in the indication of radioactivity percentage ratios, and accordingly there had not been devised a suitable method and apparatus for the making of such measurements by persons not having a high degree of skill and experience in making measurements of this general character.

The present invention provides a method and apparatus for indicating the percentage ratio of the radioactivity of a radioactive specimen to that of a standard specimen which are extremely simple to perform and to operate, and the employment of which makes possible the use of radioactivity techniques, particularly the use of radioactive iodine in thyroid diagnosis and therapy, by medical personnel having little training or experience in the operation or reading of instruments for the measurement and detection of radioactivity. The method and apparatus of the invention will of course find many routine applications in other fields of endeavor, both scientific and industrial, where the potentialities of radioactive isotopes have have not yet been fully realized because of the difficulties encountered by persons not trained or experienced with relatively complex radioactivity measuring instruments. Understanding of the present invention, and of the essential features of the method and apparatus which constitute the invention, will best be obtained from the description of simple embodiments thereof which are illustrated in the drawing and described below in accordance with the patent laws.

In the drawing:

Figure 4 is a partially schematic block diagram of a particular form of the apparatus of Figure 3.

Figure 1:
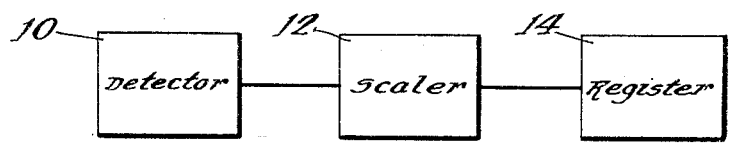
Figure 1 is a block diagram of one form of equipment with which the broader aspects of the method of the invention may be practiced.

Referring first to Figure 1, it will be seen that the apparatus therein illustrated, which is suitable for the practice of the method of the invention in its broad aspects, is of a type which is conventional and well known. A detector 10, a Geiger tube or scintillation counter, is coupled to a scaler 12 of any desired scaling factor. The scaler 12 is coupled to a register 14 which registers the number of pulses received from the scaler 12. It will of course be understood that as used herein the scaler 12 includes a suitable input amplifier and pulse-height discriminator. The register 14 may be, for example, an electro-mechanical register, or itself may be a scaler. Whatever its construction, the register 14 must, in practicing the method of the invention, be capable of recording and indicating a number of pulses from the scaler 12 up to and including 100. The register 14 is preferably of the repetitive cycle type which recommences at zero each time its capacity is reached; as will be shown below, the employment of a register of this type having a full capacity of $10^n$, where $n$ is an integer greater than unity, eliminates a resetting operation in practicing the method of the invention. Thus the register 14 is of a type normally used in systems such as shown in Figure 1, an electro-mechanical register or electronic scaler having a capacity of 100 or 1000 counts. The scaling factor of the scaler 12 is preferably non-decimal (normally binary), since the expense and complication of a decimal scaler may be avoided without introducing any complication or inaccuracy in the method. Thus the scaler 12 and register 14 may be a decimal or non-decimal scaler followed by an electro-mechanical register, or cascaded decimal scalers, either of which combinations are well known; but the most desirable combination is a non-decimal scaler followed by a decimal scaler.

The conventional equipment shown in Figure 1 is employed in the method of the invention in the following fashion:

The detector 10 is first exposed to the sample which constitutes the standard specimen (such as the duplicate specimen which has previously been set aside, as described above in connection with the thyroid measurements). The scaler 12 is operated until the register 14 indicates the reception of 100 (or 1000 if desired) output pulses from the scaler 12 and the equipment is then inactivated, the time for the reaching of this count being recorded. Thereupon, the scaler 12 and the register 14 are reset to zero if required. It will be noted that such resetting of the scaler 12 is not required if the equipment is inactivated promptly at the time set out above, since the output pulse from the scaler 12 is normally transmitted at the end of each cycle of the scaler. Likewise, if the register 14 is of the type which recycles upon reaching its capacity, and if that capacity is equal to the predetermined count, no resetting of the register 14 is required. The equipment is then reactivated while the detector 10 is exposed to the sample under measurement during the same time interval as that previously recorded for the standard specimen. At this point the equipment is again inactivated. The number now indicated by the register 14 constitutes a direct indication (a decimal point being inserted if the number registered during the interval fixed by the standard specimen was 1000 or a higher integral power of 10) of the percentage ratio of the radioactivity of the unknown specimen to that of the standard specimen. In the case of the thyroid measurement discussed above, the indication of the register 13 is a direct reading of the percentage of the iodine absorbed in the thyroid.

It will be seen that the essence of the method as described above lies in the steps of generating pulses proportional in rate of occurrence to the radioactivity of the standard until the number thereof is equal to a multiple of 100, generating pulses identically proportional in rate of occurrence to the radioactivity of the unknown specimen, and registering the quotient of the number of the latter pulses occurring during the time required for the occurrence of the aforesaid number of the former pulses, divided by the multiplier of the above-mentioned multiple, so that the quotient is equal to the percentage ratio of the activity of the unknown specimen to that of the standard. It will also be seen that an error is introduced by disregarding the remainder which appears on the scaler 12 at the termination of the entire operation. This error is, however, less than 1%, and is found to be of substantially no consequence in measurements made for diagnosis and therapy, as opposed to research. Of course, if extreme accuracy is desired, the number of counts recorded on the register 14 in the first operation may be made 1000 (or a further integral power of 10) instead of 100, and in this event the error introduced by disregarding the remainder when the second quotient is taken is limited to $\frac{1}{10}$ (or less) of 1%.

Figure 2:
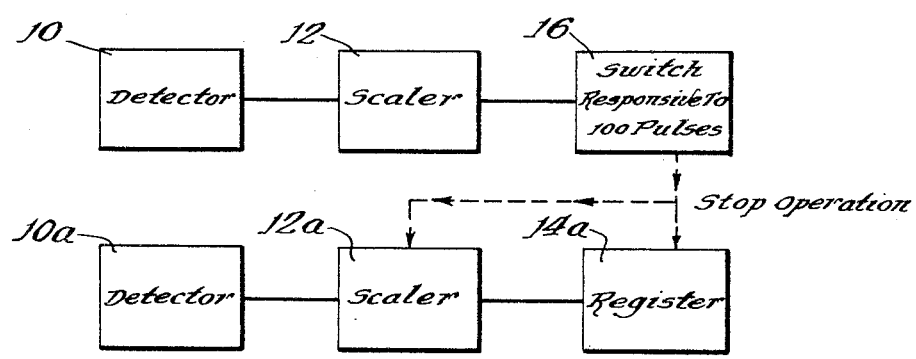
Figure 2 is a block diagram of a system embodying the method and apparatus of the invention.

In Figure 2 is shown a novel type of apparatus for indicating this percentage ratio of the radioactivity of one radioactive specimen to that of another. In the apparatus of this figure, a detector 10 and a scaler 12 are provided in the manner previously described. The output of the scaler 12 is here coupled to a switch 16 which operates in response to reception of 100 pulses from the scaler 12. A second detector 10a is coupled to a second scaler 12a, these elements being identical with the detector 10 and scaler 12, respectively. The output of the scaler 12a is coupled to a register 14a which is the same as the register 14 of Figure 1. The switch 16 is responsive to the reception of 100 pulses from the scaler 12 to stop the operation of the scaler 12a and the register 14a upon reception of 100 pulses from the scaler 12.

In operating the device of Figure 2, the detector 10 is exposed to the standard radioactive specimen, and the detector 10a is simultaneously exposed to the sample which is under measurement, both channels being activated simultaneously. Upon reception of 100 pulses from the scaler 12 by the switch 16, the register 14a is stopped and the reading obtained therefrom is a direct reading of the percentage ratio desired. It will be understood that the switch 16 may be of a number of conventional types, such as a commercially available electro-mechanical indicating register having incorporated therein a switching mechanism operative upon the reception of 100 (or 1000 or a further integral power of 10 if extreme accuracy is desired) pulses, or a stepping switch, or a predetermined count electronic scaler of any commercially available type.

Figure 3:
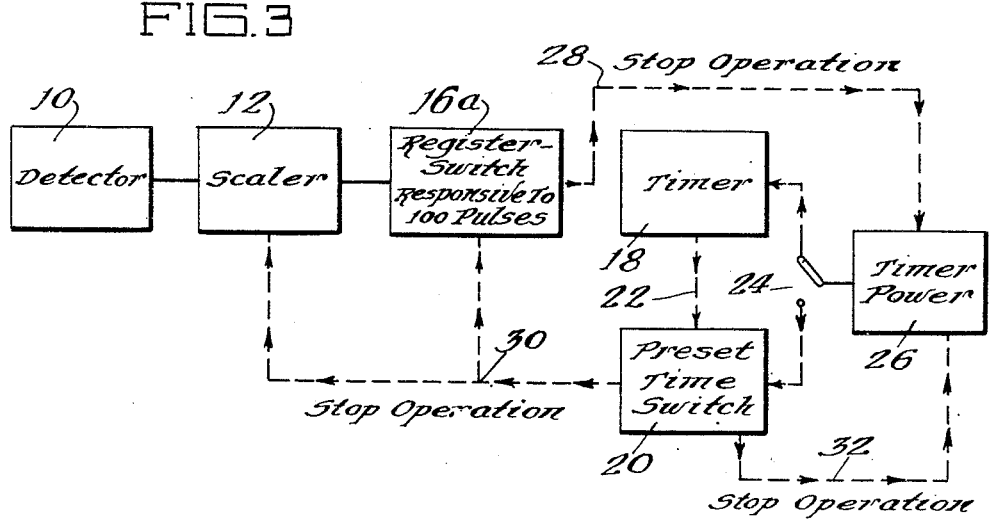
Figure 3 is a block diagram of another form of the apparatus of the invention.

The apparatus shown in Figure 2 may be subject to the objection that it is relatively expensive due to the necessity of duplicate detectors and scalers, and also that it may be difficult to operate due to the necessity of adjustment of the scalers and the pulse-height selectors which are provided therein so that the sensitivities of the two channels are identical. In Figure 3 is shown an improved apparatus for carrying out the method generally described above. Here the detector 10 is coupled to the scaler 12 which is in turn coupled to a register-switch 16a responsive to 100 (or a further integral power of 10) pulses. The register-switch 16a is generally identical with the switch 16 described above in connection with Figure 2, but is required to have indicating means registering the number of pulses received, a condition which is of course met by an electro-mechanical counter switch or predetermined count scaler of the types commercially available. There are additionally provided a timer 18 and a preset time switch 20, the timer 18 being coupled, as indicated by the dotted line 22, to the preset time switch 20 to preset the timing interval of the present time switch 20 to correspond to the elapsed time during which the timer 18 is run. The preset time switch may, if desired, be of the commercially available type in which the timing interval is set by rotation of a suitable dial. The timer 18 may, in this case, be a simple motor, preferably synchronous, the coupling indicated by the dotted line 22 being a mechanical coupling to the presetting mechanism of the switch 20, so that the switch 20 is automatically set to operate at the expiration of a time equal to the time during which the timer 18 is operated. As indicated at 24, a switch, which may be manually operated, selectively provides power from a source of time power 26 either to the timer 18 or to the preset time switch 20. As indicated by the dotted line 28, the timer power at 26 is cut off or stopped when the register-switch 16a receives the 100th pulse from the scaler 12. As indicated by the dotted couplings 30 and 32, the scaler 12, the register switch 16a, and the timer power source 26 are all inactivated upon operation of the switch 20 for the time which has been preset thereon.

The manner in which the apparatus shown in Figure 3 is adapted to perform the method of the invention will readily be seen. The detector 10, which produces electrical pulses proportional in rate to radioactivity, is exposed to the standard specimen with the switch 24 in the position to feed power to the timer 18, which constitutes means for measuring elapsed time. Thereupon the equipment remains in operation until 100 pulses are received by the register-switch 16a, at which point the timer power source 26 is inactivated. The timer 18 accordingly sets the preset time switch 20 to time an interval equal to the time required for the detector 10 to produce a number of pulses equal to 100 times the scaling factor of the scaler 12. Thereupon the detector 10 is exposed to the sample under measurement with the switch 24 in the position to feed power to the time switch 20. The equipment operates in this condition for the time set on the time switch 20, at the expiration of which the scaler 12, the register-switch 16a, and the source of timer power 26 are all inactivated. At this point the indication of the register-switch 16a, which is the quotient of the number of pulses occurring divided by the scaling factor, constitutes a direct indication of the percentage ratio of the radioactivity of the unknown specimen to that of the standard specimen.

It will of course be understood that the device of Figure 3, may readily be constructed from standard units of manufacture which are familiar to those skilled in the art, a variety of specific forms of the circuit elements indicated in block form being available and familiar. In Figure 4, there is illustrated a particular electrical system which may be employed to provide the timer, the timer power, and the preset time switch of Figure 3, together with certain of the couplings shown in dotted form in Figure 3. In the system of Figure 4, the output of a scintillation counter 34, corresponding to the detector 10 of Figure 3, is coupled to a pulse equalizer (and amplifier) 36, the output of which is in turn coupled to a scale-of-16, designated 38, which is a four-stage binary scaler, the latter being coupled in turn to a predetermined count scale-of-100 designated 40. As is conventional in predetermined count scalers, a relay having a winding 42 and normally open contacts 44 is actuated upon the recording of 100 counts on the predetermined count scaler 40. As indicated by the dotted lines 46, the closing of the contacts 44 inactivates the scalers 38 and 40. A 5 pulse per second pulse generator 48 is selectively coupled by a switch 50 to the drive winding 52 of a multi-position pulse-driven switch generally designated 54 or to the drive winding 56 of a similar switch generally designated 58. The switches 54 and 58 may be of the type commonly known as "stepping switches," which are commonly available from many manufacturers of telephone relays, and which have large numbers of stationary contacts, the number of contacts being further increased by suitable interconnection of successive switch banks in the manner which is conventional in employment of such switches. It will of course be understood that the relatively small number of stationary contacts 60 and 62 which are illustrated constitute only a small portion of the number of contacts actually incorporated in the type of switches so schematically indicated. In one embodiment of the invention, the switches 54 and 58 are 400-position switches, having corresponding contacts directly interconnected, as shown. The rotor contacts 64 and 66 of the respective switches are connected in series with a power source 68 and a relay winding 70, the contacts 72 associated with the winding 70 being connected in parallel with the contacts 44, described above. As shown by the dotted line 74, the closing of either the contacts 44 or the contacts 72 stops the operation of the pulse generator 48 in addition to stopping the operation of the scalers 38 and 40 as described above. The initial positions of the rotor contacts 64 and 66 are such as to make contact with the fixed contacts 60 and 62 which are uppermost in the drawing, and which are otherwise unconnected. The detector 34 is exposed to the standard specimen with the switch 50 in the position wherein the pulses from the pulse generator 48 are fed to the winding 52, thus advancing the rotor contact 64 one position (in the direction indicated by an arrow) each one-fifth of a second, this advancement of the rotor 64 continuing until 1600 pulses have been fed into the scaler 38, at which time the equipment, including the pulse generator 48, is inactivated as described above by the closing of contacts 44. The switch 50 is then thrown to the position wherein the rotor 66 is driven (in the direction indicated by an arrow) by the pulses from the pulse generator 48, the motor 64 being disabled and remaining in the position previously reached, the counter 34 now being exposed to the unknown specimen under measurement. At this point, therefore, the rotor contact 66 now moves forward one position each one-fifth of a second, and this operation continues until the rotor 66 reaches the position corresponding to that occupied by the rotor 64, at which time the relay winding 70 is energized and the counting operation and the operation of the switch 58 are accordingly terminated. The reading of the scaler 40 is a direct indication of the percentage ratio of the activity of the specimen under measurement to that of the previously measured standard (the former of course being smaller than the latter). In the embodiment illustrated in Figure 4, there is provided a switch 76 mechanically coupled to the switch 50, the switch 76 automatically resetting the scalers 38 and 40 each time the position of the switch 50 is changed.

In accordance with the patent laws, there are above described, and schematically illustrated in the drawing, a number of embodiments of the method and apparatus of the invention. Obviously, those skilled in the art will readily devise variants which utilize the basic teachings of the invention. Accordingly, the scope of the monopoly to be afforded the invention shall be determined, not from the particular embodiments described herein, but solely from the appended claims.

What is claimed is:

1. Apparatus for indicating the percentage ratio of the radioactivity of a radioactive specimen to that of a standard specimen comprising, in combination, a radiation detector adapted to produce electrical pulses proportional in rate to radioactivity, a preset time switch adapted to be set to a plurality of selectable timing intervals, means coupled to the detector to set the preset time switch for a timing interval equal to the time required for the occurrence of a number of pulses from the detector equal to a multiple of 100, and means responsive to the preset time switch and to the detector to register the quotient of the number of pulses from the detector occurring during such timing interval divided by the multiplier of said multiple.

2. Apparatus for indicating the percentage ratio of the radioactivity of one radioactive specimen to that of a standard specimen comprising, in combination, a radiation detector adapted to produce electrical pulses proportional in rate to radioactivity, elapsed time measuring means, means for operating the elapsed time measuring means only during the occurrence of a number of pulses responsive to the standard equal to a multiple of 100, a preset time switching means, means responsive to the elapsed time measuring means to set the switching means for a timing interval equal to that required for said occurrence, and means to register the quotient of the number of pulses occurring from the sample under measurement during the timing interval so set on the switching means divided by the multiplier of said multiple.

3. Apparatus for indicating the percentage ratio of the radioactivity of a radioactive specimen to that of a standard specimen comprising, in combination, a radiation detector adapted to produce electrical pulses proportional in rate to radioactivity, a non-decimal scaler coupled to the detector, a decimal scaler coupled to the first scaler, a preset time switching means, means responsive to the decimal scaler to set the preset time of the switching means equal to the time required for one complete cycle of the decimal scaler when the detector is exposed to the standard specimen, and means for coupling the switching means to at least one of the scalers so that subsequent exposure of the detector to the unknown specimen produces on the decimal scaler a direct indication of the percentage ratio.

4. A method of indicating the percentage ratio of the radioactivity of one radioactive specimen to that of a standard specimen of at least equal activity comprising the steps of generating pulses proportional in rate of occurrence to the radioactivity of the standard, registering the quotient of the number of pulses occurring divided by a constant factor until this quotient reaches 100, and thereupon generating pulses proportional in rate of occurrence to the radioactivity of the unknown specimen, and registering the quotient of the number of these pulses occurring during the time previously required for the first registering divided by the same constant factor, whereby the second quotient is equal to the percentage ratio of the activity of the unknown specimen to that of the standard.

5. Apparatus for indicating the ratio of the radioactivity of an unknown specimen to that of a standard speciment comprising means including a radiation detector and scaler for producing electrical pulses proportional in rate of occurrence to radioactivity, a first inactivating means coupled to the pulse-producing means for inactivating the pulse-producing means upon receipt therefrom of $10^n$ pulses, where $n$ is an integer greater than unity, a second inactivating means coupled to the pulse-producing means for inactivating the pulse-producing means on the expiration of a presettable time interval, a coupling between the first and second inactivating means constructed and arranged for presetting the presettable time interval of the second inactivating means, and manually operable switch means to selectively activate and inactivate the presetting coupling for measurements on the standard and unknown specimens, respectively, whereby the number of pulses produced by the pulse-producing means during the time interval so preset is a direct indication of the percentage ratio of the radioactivity of an unknown specimen to that of a previously measured standard specimen.

6. Apparatus for indicating the percentage ratio of the radioactivity of one radioactive specimen to that of a standard specimen comprising, in combination, a radiation detector adapted to produce electrical pulses proportional in rate to radioactivity, an elapsed time timer, means for operating the timer only during the occurrence of a number of pulses responsive to the standard equal to a multiple of 100, a preset time switching means, a coupling between the timer and the switching means constructed and arranged for setting the switching means for a timing interval equal to that required for said occurrence, and means to register the quotient of the number of pulses occurring from the sample under measurement during the timing interval so set on the switching means divided by said multiple.

7. Apparatus for indicating the percentage ratio of the radioactivity of one radioactive specimen to that of a standard radioactive specimen comprising, in combination, a radiation detector adapted to produce electrical pulses proportional in rate to radioactivity, means to measure the time required for the occurrence of a predetermined number of such pulses, such number being a multiple of $10^n$, where $n$ is an integer greater than unity, means to indicate numerically the number of pulses occurring in a presettable time divided by the multiplier of said multiple, and a coupling between said predetermined number means and said presettable time means constructed and arranged for the setting of said presettable time equal to said first time.

8. Apparatus for indicating the percentage ratio of the radioactivity of a radioactive specimen to that of a standard specimen comprising, in combination, a radiation detector adapted to produce electrical pulses proportional in rate to radioactivity, counting apparatus comprising a scaler coupled to the detector and a register coupled to the scaler, a preset time switching means, circuit elements interconnecting the counting apparatus and the switching means and constructed and arranged to set the preset time of the switching means equal to the time required for the registering of $10^n$ pulses on the register, where $n$ is an integer greater than unity, when the detector is exposed to the standard specimen, and means for coupling the switching means to the counting apparatus, so that subsequent exposure of the detector to the unknown specimen produces on the register a direct indication of the percentage ratio.

9. Apparatus for indicating the percentage ratio of the radioactivity of a radioactive specimen to that of a standard specimen comprising, in combination, a radiation detector adapted to produce electrical pulses proportional in rate to radioactivity, counting apparatus comprising a scaler coupled to the detector and a register coupled to the scaler, a preset time switching means including a movable presetting member connected to set the preset time of the switching means, a drive connected to the movable member, a connection between the drive and the register constructed and arranged to inactivate the drive upon the registering of $10^n$ pulses on the register in response to a standard specimen, where $n$ is an integer greater than unity, a switch independent of the register in circuit with the drive to disable the drive for measurements on unknown specimens, and means for coupling the preset time switching means to the counting apparatus.

References Cited in the file of this patent

UNITED STATES PATENTS

| | | |
|---|---|---|
| 2,585,649 | Hanson | Feb. 12, 1952 |
| 2,610,303 | Bell | Sept. 9, 1952 |
| 2,685,027 | Alvarez | July 27, 1954 |
| 2,695,364 | Wolfe | Nov. 23, 1954 |